United States Patent [19]

Hayashi et al.

[11] Patent Number: 4,600,811
[45] Date of Patent: Jul. 15, 1986

[54] SUBSCRIBER LINE INTERFACE CIRCUIT

[75] Inventors: Takao Hayashi; Masanobu Arai; Takashi Shinozuka, all of Tokyo, Japan

[73] Assignee: NEC Corporation, Tokyo, Japan

[21] Appl. No.: 565,975

[22] Filed: Dec. 27, 1983

[30] Foreign Application Priority Data

| Dec. 28, 1982 | [JP] | Japan | 57-229070 |
| Dec. 29, 1982 | [JP] | Japan | 57-229990 |
| Jun. 14, 1983 | [JP] | Japan | 58-106206 |
| Aug. 31, 1983 | [JP] | Japan | 58-159825 |
| Nov. 16, 1983 | [JP] | Japan | 58-215562 |

[51] Int. Cl.$^4$ .............................. H04M 1/76
[52] U.S. Cl. .................. 179/16 AA; 179/16 F; 179/170 NC
[58] Field of Search ........... 179/16 AA, 16 F, 18 FA, 179/170 NC, 81 R, 70, 77

[56] References Cited

U.S. PATENT DOCUMENTS

| 4,203,009 | 5/1980 | Tattersall | 179/16 AA |
| 4,292,478 | 9/1981 | Davis et al. | 179/170 NC |
| 4,315,107 | 2/1982 | Ciesielka et al. | 179/16 F |
| 4,359,609 | 11/1982 | Apfel | 179/16 F |
| 4,375,015 | 2/1983 | Chambers, Jr. | 179/170 NC |
| 4,387,273 | 6/1983 | Chea, Jr. | 179/16 F |
| 4,388,500 | 6/1983 | Regan | 179/170 NC |
| 4,433,213 | 2/1984 | Albers et al. | 179/18 FA |
| 4,472,608 | 9/1984 | Beirne | 179/170 NC |
| 4,476,350 | 10/1984 | Aull et al. | 179/70 |
| 4,514,595 | 4/1985 | Rosenbaum et al. | 179/16 F |

Primary Examiner—Gene Z. Rubinson
Assistant Examiner—R. Vaas
Attorney, Agent, or Firm—Laff, Whitesel, Conte & Saret

[57] ABSTRACT

In a subscriber line interface circuit of a telephone switching system, a differential amplifier (1) is coupled through the line terminals (T, R) of a two-wire subscriber line for detecting a voltage difference developed thereacross. First and second resistances (8, 9) of equal values are coupled at their first ends to the line terminals, respectively. Tip and ring drivers (2, 3) are connected to the other end of first and second resistances for driving the load impedance of the subscriber line. First, second and third feedback loops ($f_1$, $f_2$, $f_3$) are provided, the first feedback loop being coupled from an output of differential amplifier (1) to the input of the drivers (2, 3) vary the impedance characteristics of the first and second resistances (8, 9) so that a high impedance is synthesized across each of the first and second resistances. The second and third feedback loops are also coupled from the output of differential amplifier (1) to the drivers (2, 3), each of the second and third feedback loops having a different passband frequency characteristic and having the effect of reducing the synthesized impedances to a predetermined value.

11 Claims, 5 Drawing Figures

SUBSCRIBER LINE INTERFACE CIRCUIT

BACKGROUND OF THE INVENTION

1. Field of the Invention

The present invention relates to a telephone subscriber line interface circuit.

2. Description of the Prior Art

In digital telephone switching systems the subscriber line interface circuit is required to meet the various functions known as BORSHT which is an acronym of Battery feed, Over-voltage protection, Ringing current supply, Supervisory of line status, Hybrid circuit (two-wire to four-wire conversion) and Test of subscriber lines. Although many attempts have hitherto been made to implement these functions in integrated circuits for purposes of achieving compactness, improving reliability and reducing power dissipation, the proposed subscriber line interface circuits are not satisfactory in a number of aspects.

U.S. Pat. No. 4,387,273 granted to Ramon C. W. Chea, Jr. discloses a subscriber line interface circuit with an impedance synthesizer. The impedance synthesizer includes two resistors having their first ends coupled respectively to the subscriber line terminals and two voltage amplifiers which are connected to the opposite ends of the resistors, respectively. The voltage amplifiers are driven by a differential line voltage between the line terminals which is supplied through a circuit having a predetermined transfer function. In the disclosed synthesizer, the transfer function is set equal to a constant value k which is implemented by an inverting amplifier. If the gain of each voltage amplifier is unity, the impedance Z between the subscriber line terminals is represented by:

$$Z = 2R/(1-2K) \quad (1)$$

where, R is the values of the aforesaid resistors.

The transfer function K must satisfy following equation to obtain the impedance Z.

$$K = (\tfrac{1}{2}) - (R/Z) \quad (2)$$

Since Equation 2 must be computed to determine the transfer function K, it is impossible to establish a one-to-one correspondence between the desired impedance and transfer function. However, from the circuit design standpoint it is required that the transfer function be an integral multiple of the desired impedance.

A Transformerless hybrid circuit for circuit integration is described in Articles "Design and Performance of Subscriber line Interface Module for Digital Switching System", ISSCC 1980, by Keiichi Yasuda et al. and "A High-Voltage IC for a Transformerless Trunk and Subscriber Line Interface", IEEE Journal of Solid-State Circuits, Vol. SC-16, No. 4, August 1981, Denis W. Aull et al. The hybrid circuits discussed in these publications include a crosstalk canceller which is designed so that it has no adverse effect on the transmission characteristic of the path from the input terminal of the four-wire circuit to the subscriber line and requires at least three impedance networks for synthesizing a terminal impedance $Z_T$, a transmission impedance $Z_S$ and a balancing impedance $Z_B$ is used to balance against the load impedance $Z_L$. However, even if the impedance $Z_B$ is balanced against the load impedance, distortion can occur in the transmission characteristic of the path from the input line of four-wire circuit to the two-wire subscriber line if the terminal impedance $Z_T$ is not equal to the load impedance $Z_L$. This arises from the fact that, since the transmission path is represented by a source having an impedance $Z_S = Z_T$ and a load impedance $Z_L$ coupled thereto, the ratio $Z_L/Z_S$ becomes a non-real number and hence the transmission path acquires a particular response characteristic in the frequency spectrum.

It is further desired that battery feed and dial pulse detection be provided by a single circuit and a variety of proposals have hitherto been made. Most these proposals include an active circuit using capacitors to synthesize an inductance equivalent to the conventional feeding coil. However, these proposals are still unsatisfactory for dial pulse detection because of the inherent difficulty to provide a fast response characteristic.

SUMMARY OF THE INVENTION

A primary object of the present invention is to provide a subscriber line interface circuit which relaxes the precision requirements imposed on each stage of analog computation involved in synthesizing a desired impedance value by the provision of a first feedback loop which feeds back a signal having the same voltage level as the input signal and second and third feedback loops each having a transfer function required to synthesize the desired impedance over a predetermined frequency range, whereby the high precision requirement is only required of the first feedback loop, reducing the number of high precision circuit components.

A subscriber line interface circuit of the present invention comprises differential amplifier means coupled through line terminals to a two-wire subscriber line for detecting a voltage difference developed across the line terminals. First and second resistance means of equal resistance values each having first and second opposite ends are connected at their first ends to the line terminals, respectively. Driver means is coupled to the second ends of the first and second resistance means for driving a load coupled to the distant end of the subscriber line. First, second and third feedback means are provided. The first feedback means is coupled from the output of the differential amplifier means to the input of the driver means for changing the impedance characteristics of the first and second resistance means so that a high impedance is synthesized across each of the first and second resistance means. The second and third feedback means are also coupled from the output of the differential amplifier means to the input of the driver means, each of the second and third feedback means having a different passband frequency characteristic for reducing the synthesized impedances to a predetermined value.

A second object of the present invention is to provide a subscriber line interface circuit which includes a two-wire to four-wire converter having two impedance networks which dissipate less power than the prior art networks.

A third object of the present invention is to provide a subscriber line interface circuit including a two-wire to four-wire converter having a flat frequency response characteristic from the input terminal of a four-wire circuit to the two-wire subscriber line.

A fourth object of the present invention is to provide a subscriber line interface circuit in which the battery feeding circuit has a variable response time as a function of the amplitude of the input signal so that it presents a fast response characteristic to dial pulses.

BRIEF DESCRIPTION OF THE DRAWINGS

The present invention will be described in further detail with reference to the accompanying drawings, in which.

DETAILED DESCRIPTION

Figure 1:
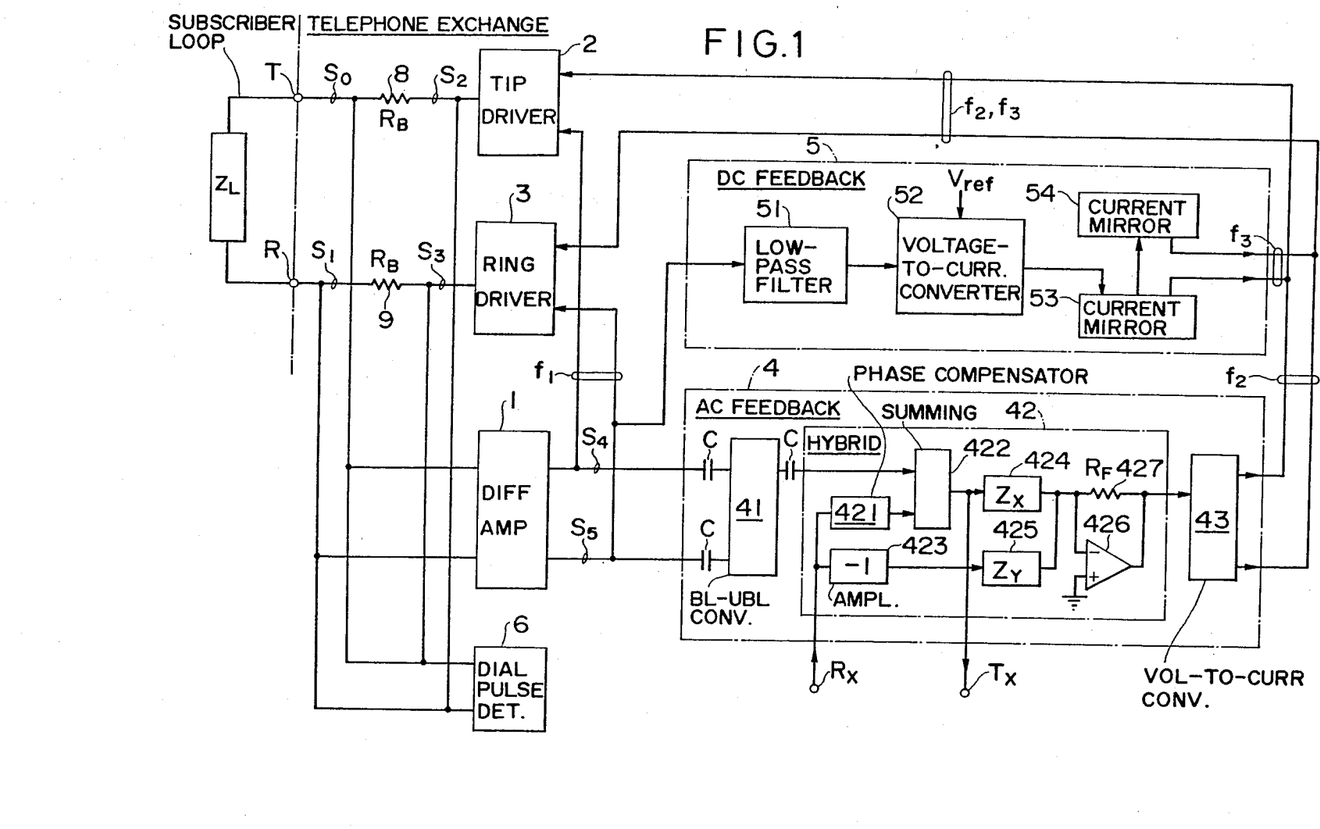
FIG. 1 is a block diagram illustrating the general structure of the subscriber line interface circuit according to the present invention.

Referring now to FIG. 1, a tip line of a two-wire subscriber loop is connected to a tip terminal T and a ring line of the loop connected to a ring terminal R, the loop having a load impedance $Z_L$ at the distant end of the loop in subscriber premises. To the tip and ring terminals are connected a differential amplifier 1 whose output terminals are coupled through a first feedback loop $f_1$ to an input of a tip driver 2 and an input of a ring driver 3. The output terminals of the differential amplifier 1 are further coupled through a second feedback loop $f_2$ comprising an AC feedback circuit 4 and further through a third feedback loop $f_3$ including a DC feedback circuit 5.

The AC feedback circuit 4 comprises a balance-unbalance converter 41, a hybrid circuit 42 and a voltage-to-current converter 43 which converts the output voltage of the hybrid circuit 42 to currents which are supplied to the tip driver 2 and ring driver 3, respectively. DC decoupling capacitors C are provided in the input and output circuits of the balance-unbalance converter 41. The balance-unbalance converter 41 provides conversion of the balanced output of the differential amplifier 1 to a signal unbalanced with respect to ground. While the capacitors C are provided both on the input and output circuits of the converter 41, the latter could equally as well operate if the capacitances are provided only in the input or output circuit thereof.

The hybrid circuit 42 comprises a phase compensator 421 which introduces a predetermined amount of phase delay to a signal applied to an input terminal Rx of a four-wire circuit which is coupled to the telephone switching system.

The output of the phase compensator 421 is weighted and summed in a summing circuit 422 with the output of the balance-unbalance converter 41 such that undesired components resulting from the circuit unbalance are canceled, the summed output being delivered to an output terminal Tx of the four-wire circuit. Impedance networks 424 and 425 are provided having impedances $Z_X$ and $Z_Y$, respectively. The summed output from circuit 422 is multiplied by a factor $Z_X$ at 424 and a unity-gain inverting amplifier 423 performs unity-gain inversion of an input signal at the four-wire input terminal Rx to be multiplied by a factor $Z_Y$ at 425 which is combined with the signal multiplied by $Z_X$ in an operational amplifier 426 whose output is fed back to the negative going input thereof via a resistance $R_F$ at 427.

The DC feedback circuit 5 includes a low-pass filter 51 which is coupled to one output of the differential amplifier 1. The low-pass filter 51 has a large time constant value when the input signal thereto has a small amplitude and a small time constant value when the input signal has a large amplitude. A voltage-to-current converter 52 is coupled to the output of the low-pass filter 51 to generate a current which is a function of the difference between the input voltage and a reference voltage Vref. Current mirror circuits 53 and 54 supply currents of equal value to the output current of the converter 52 to the tip driver 2 and the ring driver 3. The outputs of the tip and ring drivers 2 and 3 are connected via battery feed resistances $R_B$ at 8 and 9 to the tip and ring terminals T and R, respectively. A dial pulse detector 6 is connected across the resistors 8 and 9 to detect voltage changes thereacross to detect dialed pulses.

Figure 2:
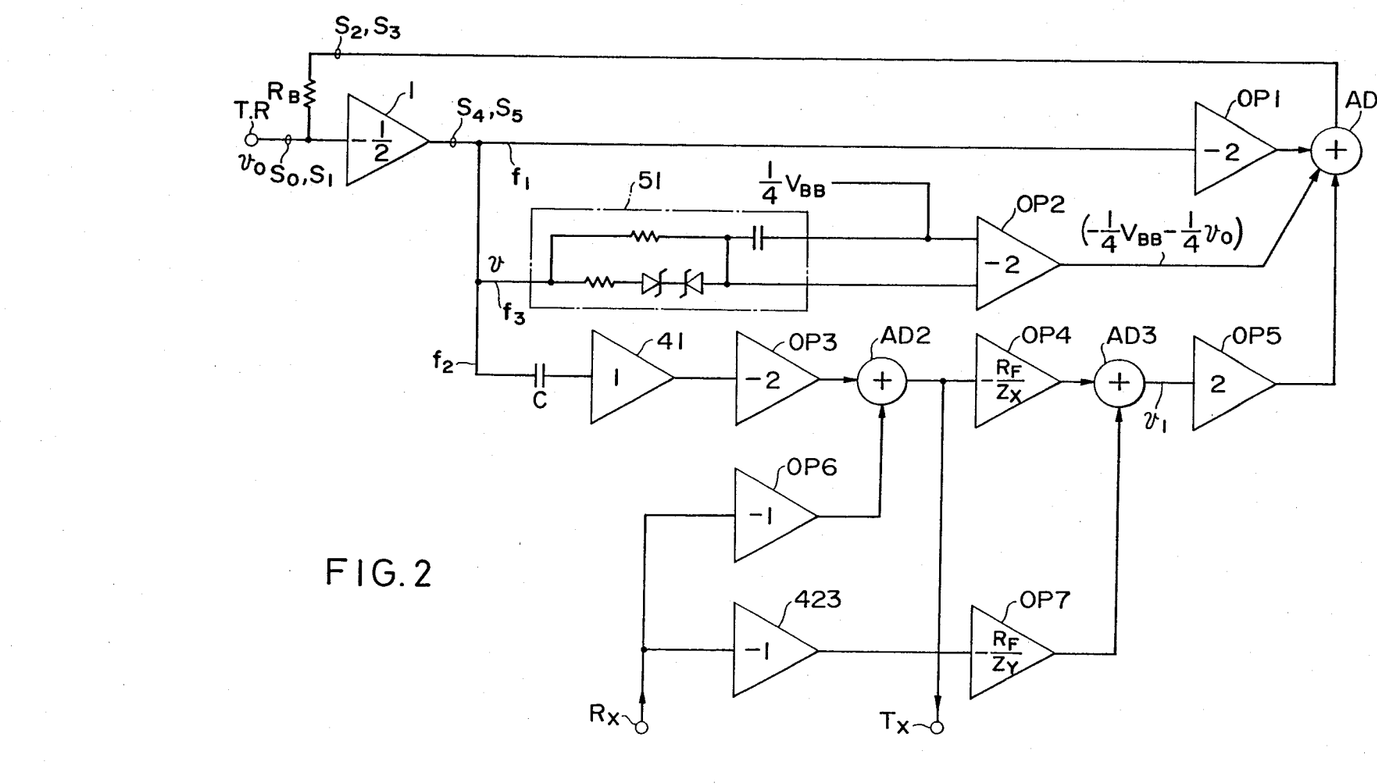
FIG. 2 is a block diagram illustrating the basic functions of the subscriber line interface circuit of FIG. 1.

FIG. 2 illustrates an equivalent circuit of the embodiment of FIG. 1. A voltage $v_0$ developed across the line terminals T and R is applied to the differential amplifier 1 and passes through first, second and third feedback loops $f_1$, $f_2$ and $f_3$ whose outputs are combined in an adder AD1 and the combined output appears across the resistance $R_B$. The first feedback loop $f_1$ feeds the output of the differential amplifier 1 via an operational amplifier OP1 to an adder AD1. The second feedback loop $f_2$ includes the capacitance C which passes the higher frequency components to the differential amplifier 41 whose output is coupled via an operational amplifier OP3 to an adder AD2 and through an operational amplifier OP4 to an adder AD3 and an operational amplifier OP5 to the adder AD1. The third feedback loop $f_3$ comprises the low-pass filter 51 and an operational amplifier OP2 whose output is coupled to the adder AD1.

An input signal to the four-wire input terminal Rx is coupled by way of operational amplifiers 423 and OP7 to the adder AD3 where it is summed with the output of adder AD2 after passing through an operational amplifier OP4, the output of adder AD3 being coupled by an operational amplifier OP5 to the adder AD1 and through resistance $R_B$, differential amplifier 1, capacitor C, differential amplifier 41 and operational amplifier OP3 to adder AD2, completing a loop. The signal applied to the input terminal Rx is also coupled by an operational amplifier OP6 to the adder AD2 where it cancels the four-wire input component of the second feedback loop $f_2$ to allow the two-wire signal to be exclusively delivered to the four-wire output terminal Tx. The operational amplifier OP6 is provided with a phase adjustment function which provides a phase delay to establish a phase match in the adder AD1.

Battery feed resistances $R_B$ at 8 and 9 are synthesized by taking into account the total characteristic of the circuit from points $S_0$, $S_1$ to points $S_2$, $S_3$, while at the same time making the voltage difference across points $S_2$ and $S_3$ satisfy the following equations:

$$-(1/k_0)V_{BB}+(k_0-1)v_0/k_0 \qquad (1.1)$$

which can be rearranged as:

$$-(1/k_0)V_{BB}+v_0-(1/k_0)v_0 \qquad (1.2)$$

where, $v_0$ is the line voltage across points $S_0$ and S, $V_{BB}$ is the reference supply voltage, and $k_0$ is the ratio of resistance $R_B$ to synthesized equivalent resistance $R_{FD}$.

The line voltage $v_0$, which is expressed by the second term of Equation (1.2), is synthesized by the first feedback loop by setting the voltage gains of the differential amplifier 1 and operational amplifier OP1 to $-\frac{1}{2}$ and $-2$, respectively. This equalizes the voltages developed across resistances $R_B$ and no current thus flows therethrough. As a result, the first feedback loop has the effect of increasing the impedance values of the resistances $R_B$.

The first and third terms of Equation (1.2) are synthesized by setting the operating parameter of a DC feedback circuit of the third feedback loop to $-1/k_0 = -R_B/R_{FD}$. For example, if $k_0=4$, the voltage difference between points $S_2$ and $S_3$ is given by $-(\frac{1}{4})V_{BB}-(\frac{1}{4})V_0$. In respect of the reference voltgage $V_{BB}$, the center voltage of the two-wire circuit is given by $(\frac{1}{2})V_{BB}$ and therefore application of a reference voltage $(\frac{1}{4})V_{BB}$ to the amplifier OP2 results in a voltage $-(\frac{1}{4})V_{BB}$ at the output thereof. Since the voltage difference across points $S_4$ and $S_5$ is $-(\frac{1}{2})v_0$, the individual voltages of points $S_4$ and $S_5$ are given by $-(\frac{1}{4})v_0$ and $(\frac{1}{4})v_0$, respectively, with respect to the center voltage $(\frac{1}{2})V_{BB}$. Therefore, the above mentioned characteristics can be obtained.

The AC feedback loop included in the second feedback loop comprises a two-wire to four-wire converter. The difference signal, which is detected by the differential amplifier 1 and multiplied by a factor $-\frac{1}{2}$, is passed through capacitance C so that the DC component of the signal is removed, converted to an unbalanced signal with a unity gain by differential amplifier 41, and amplified by operational amplifier OP3 having a gain $-2$, whereby the voltage difference $v_0$ across points $S_0$ and $S_1$ appears at the output of amplifier OP3. Voltage at the four-wire input terminal $R_X$ through an inverting unity gain amplifier OP6 is subtracted from the output voltage of amplifier OP3 in the adder AD2 whose output is delivered to the output line of the four-wire circuit. The signal from the four-wire input terminal Rx is further passed through an inverting unit gain amplifier 423 to operational amplifier OP7 where it is multiplied by a factor $-R_F/Z_Y$ and applied to the adder AD3. On the other hand, the output voltage of adder AD2 is multiplied by a factor $-R_F/Z_X$ by amplifier OP4 and fed to adder AD3. The output of adder AD3 is applied to an amplifier OP5 which corresponds to the voltage-to-current converter 43 of FIG. 1 where it is multiplied by a factor 2 and applied to adder AD1. In this way, the circuit from the four-wire input terminal Rx to the two-wire circuit has a transfer function "1" which is equal to the transfer function of the circuit from the two-wire circuit to the four-wire output terminal Tx.

Figure 3:
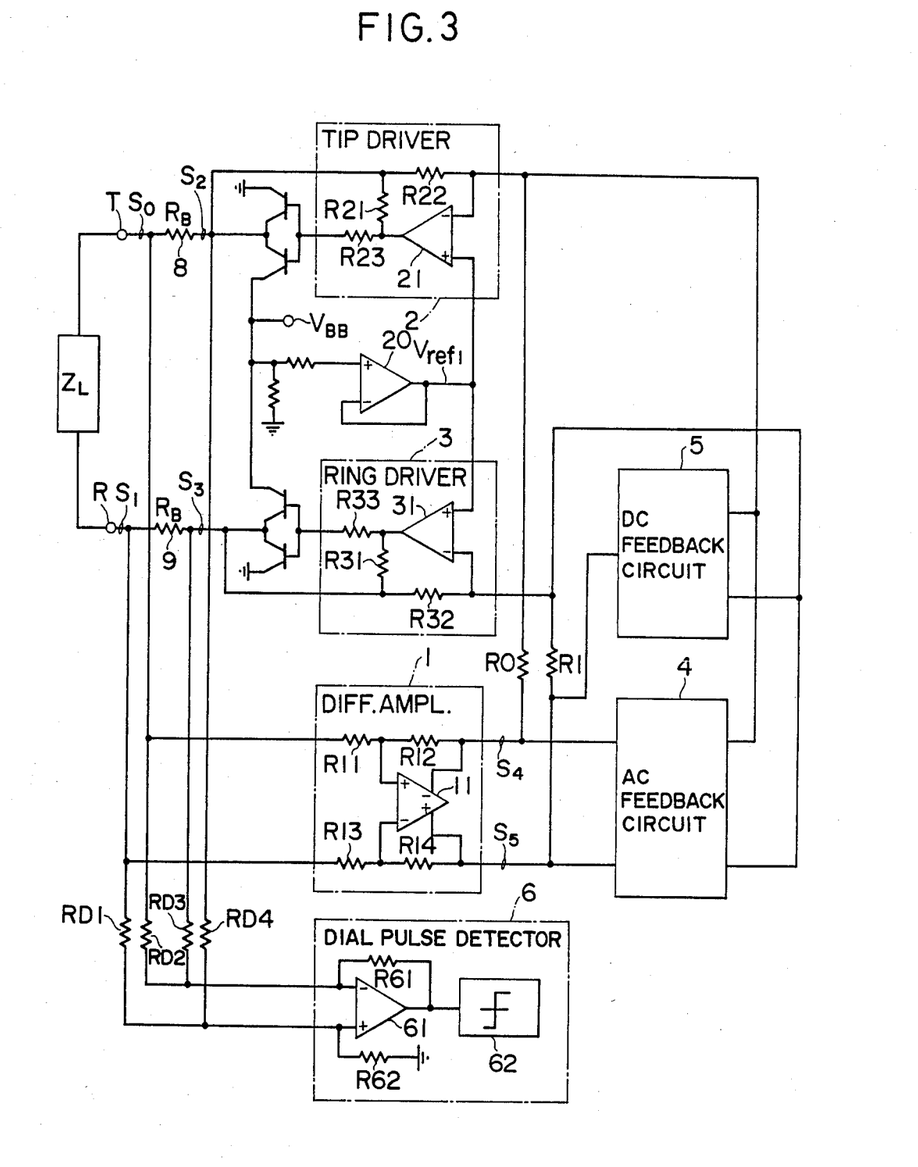
FIG. 3 is a block diagram illustrating the detail of a portion of FIG. 1 including the differential amplifier, tip and ring drivers and dial pulse detector.
Figure 4:
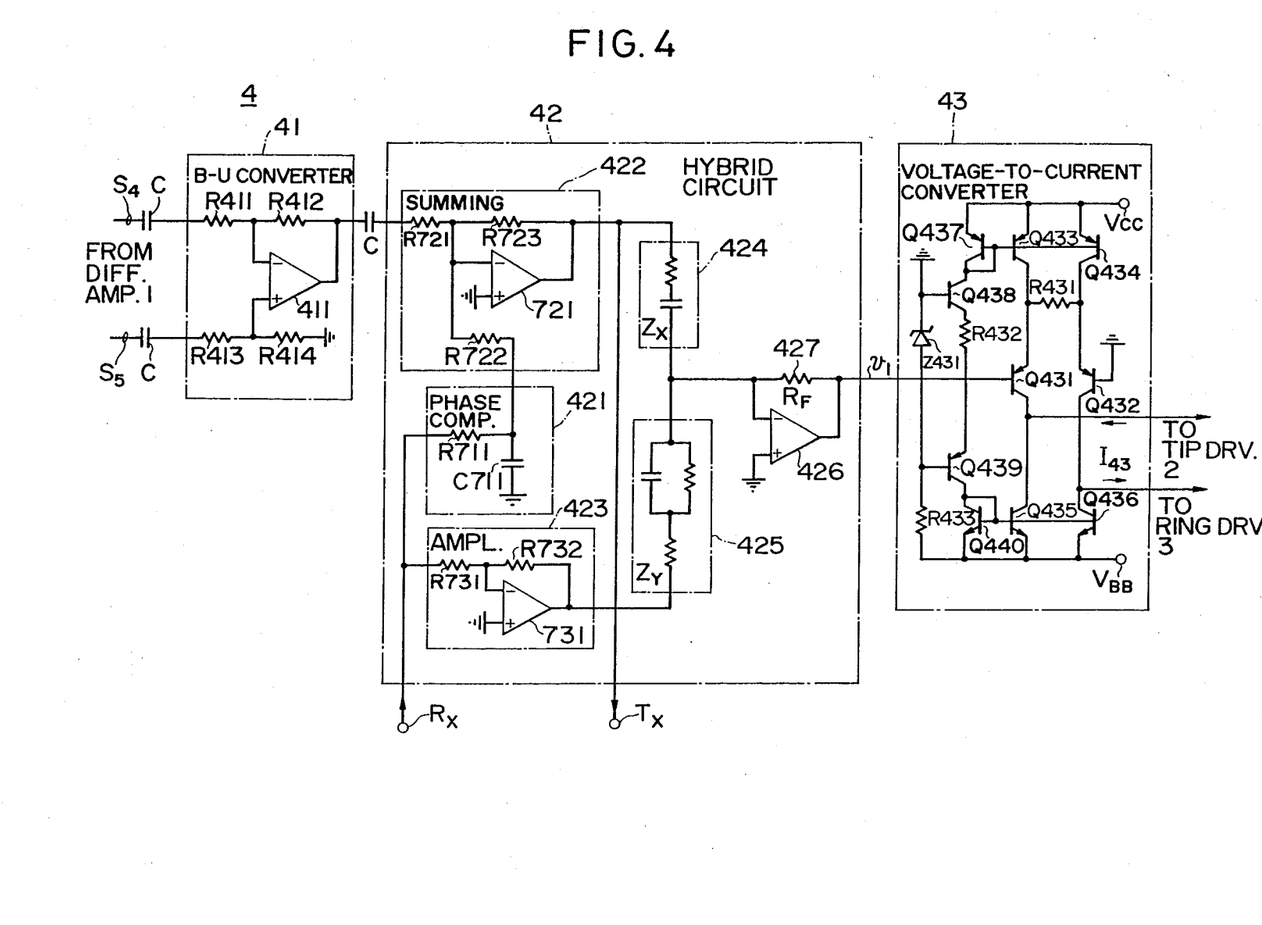
FIG. 4 is a block diagram illustrating the detail of the AC feedback circuit of FIG. 1.
Figure 5:
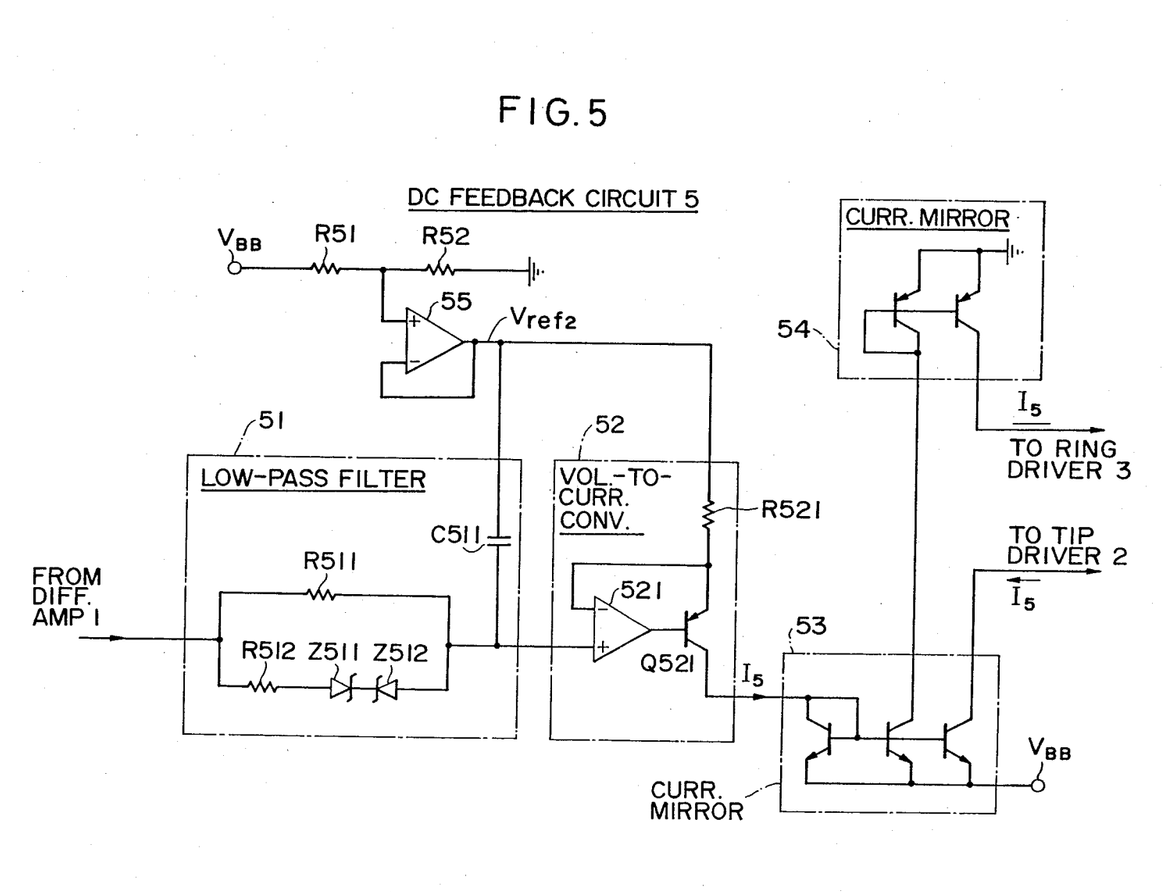
FIG. 5 is a block diagram illustrating the detail of the DC feedback circuit of FIG. 1.

Illustrated in FIGS. 3 to 5 is a practical embodiment of the circuit of FIG. 1 having the operating characteristics just described with reference to FIG. 2.

In FIG. 3, the differential amplifier 1 is comprised by an operational amplifier 11 and resistors R11 through R14 the relative values of which are given by R12/R11=R14/R13, R11=R13. If R12/R11=$\frac{1}{2}$, for example, the differential amplifier 1 will have a gain "$-\frac{1}{2}$" with which the voltage across points $S_0$ and $S_1$ is multiplied. The tip driver 2 comprises an operational amplifier 21 and resistors R21 to R23 and the ring driver 3 comprises an operational amplifier 31 and resistors R31 to R33. The relative values of the feedback resistors R22 and R32 to the input resistors R0 and R1 of the first feedback loop satisfy the relationship R22/R0=R32/R1, where R0=R1. If R22/R0=2, the tip driver 2 and ring driver 3 will have a gain of $-2$ with which the voltages at points $S_4$ and $S_5$ are multiplied. Therefore, the voltages at points $S_0$ and $S_1$ are rendered equal to the voltages at points $S_2$ and $S_3$. The output of the operational amplifier 21 is coupled by a feedback circuit including resistors R21, R22 to its inverting input and likewise the output of the operational amplifier 31 is coupled by a feedback circuit including resistors R31, R32 to its inverting input. The noninverting inputs of both operational amplifiers 21, 31 are biased at a reference voltage Vref1 which is set equal to $(\frac{1}{2})V_{BB}$ derived from a voltage source at $V_{BB}$ by a resistor network and an operational amplifier 20.

The dial pulse detector 6 comprises an operational amplifier 61, a discriminator 62 and resistors R61 and R62 and connected in circuit with resistors RD1 to RD4 to opposite terminals of resistances $R_B$ to detect the voltages developed thereacross and hence a loop current. The discriminator 62 compares the loop current value with a threshold and reconstructs the received dial pulses by generating sharply defined pulses.

FIG. 4 illustrates the detail of the AC feedback circuit 4 of FIG. 1. The balance-to-unbalance converter 41 is formed by an operational amplifier 411 and resistors R411 to R414 and arranged to detect the differential signal of the two-wire subscriber line. The relative values of resistors R411 to R414 have the relationships R412/R411=R414/R413 and R411=R413. By setting the ratio R412/R411 =1, the converter 41 will have a unity gain with which the voltage difference between points $S_4$ and $S_5$ is multiplied to derive a voltage which represents the potential difference with respect to ground. The phase compensator 421 is formed by a resistor R711 and a capacitor C711 which are connected in a low-pass filter configuration. This phase compensator provides a phase matching between the signal from the four-wire input terminal Rx with a signal which is fed back thereto through the impedance network 425 and through the output loop of the AC feedback circuit 4. The summing circuit 422 includes an operational amplifier 721 and resistors R721 to R723 the resistance values of which are given by a relationship R723/721=2 so that the circuit 422 has a gain of $-2$ with which the signal from the balance-to-unbalance converter 41 is multiplied. By setting R723/(R711+R722)=1, the signal from the input terminal Rx is multiplied by the operational amplifier 721 with a gain $-1$.

The impedance networks 424 and 425 have impedance values $Z_X$ and $Z_Y$ respectively which are given by $$Z_X=mZ_T, Z_Y=mZ_B \qquad (2.1)$$

where m is a real number, and $Z_T$ and $Z_B$ are the terminal and balance impedances, respectively. With $Z_T$=900 ohms+2.16 microfarads and m=100, the impedance network 424 can be formed by a series circuit of a 90-kilohm resistor and a 0.0216-microfarad capacitor. The amplifier 423 comprises an input resistor R731 and a feedback resistor R732 of like values and an operational amplifier 731 and coupled to the input terminal Rx so that it multiplies the signal therefrom with a gain of $-1$. The operational amplifier 426 has a resistance $R_F$ at 427 which is combined with the impedances $Z_X$ and $Z_Y$ of the networks 424 and 425 so that the amplifier 426 is given voltage gains of $-R_F/Z_X$ and $-R_F/Z_Y$. If the following relation holds, $$R_F = mR_B \qquad (2.2)$$

The voltage gains of the amplifier 426 become $-R_B/Z_T$ and $-R_B/Z_B$, respectively.

The voltage-to-current converter 43, which converts the output voltage of hybrid circuit 42 to a corresponding current, comprises a transistor Q431 having a base coupled to the output of the hybrid circuit 42 and a transistor Q432 having a base coupled to ground, the emitters of these transistors being coupled by a resistor R431. The emitters and collectors of the transistors Q431 and Q432 are coupled to constant current sources formed by transistors Q433 through Q440, resistors R432 and R433 and a Zener diode Z431 which are connected so that a constant current is generated at each of the collectors of transistors Q433 to Q436. More specifically, the output current $I_{43}$, which flows through the collectors of transistors Q431, Q432 and through the resistors R22 and R32 of tip and ring drivers 2, 3 (FIG. 3), is given by $$I_{43} = v_1/R431 \qquad (2.3)$$

where $v_1$ is the voltage impressed on the base of transistor Q431. With R431=R22=R32, the voltage output of the hybird circuit 42 is applied to the tip driver 2 and ring driver 3 in opposite polarities to each other, so that the voltage gain 2 of amplifier OP5, FIG. 2, is obtained. In this way, an overall characteristic of $-2R_F/Z_X$, which is attributed to the second feedback loop, is obtained.

Referring to FIG. 5 in which are shown details of the DC feedback circuit 5, the low-pass filter 51 comprises a resistor R512 which is connected in series with a pair of oppositely coupled Zener diodes Z511 and Z512 with the series circuit being in shunt with a resistor R511 to form a resistor-diode network one end of which is coupled to the output of differential amplifier 1 and the other end of which is coupled to a capacitor C511. The resistor R511 has a much larger value than that of resistor R512.

If a small amplitude input signal is applied to this low-pass filter 51, the Zener diodes Z511 and Z512 remain nonconductive and the resistors R511 and capacitor C511 constitute a low-pass filter having a large time constant value. Thus, it can be considered that large-valued phantom inductances are respectively synthesized between the line terminal T and ground and between the line terminal R and voltage source $V_{BB}$. On the other hand, if a large amplitude input signal is applied to the low-pass filter 51, the Zener diodes Z511, Z512 become conductive and in this case the resistor R512 and capacitor C511 form a low-pass filter having a small time constant value, thereby synthesizing small-valued phantom inductances.

The voltage-to-current converter 52 is formed by a resistor R521, transistor Q521 and an operational amplifier 521 having a noninverting input coupled to be responsive to the output of the low-pass filter 51. The output current $I_5$ of this converter 52 flows through the current mirror circuits 53, 54 to the resistors R22, R32 of the tip and ring drivers 2, 3 (see FIG. 3). A reference voltage $V_{ref2} = (\frac{1}{4})V_{BB}$ is derived from a circuit comprising an operational amplifier 55 and voltage dividing resistors R51, R52 coupled between a voltage source at $V_{BB}$ and ground. This reference voltage is fed to the capacitor C511 of the low-pass filter 51 and to the resistor R521 of the voltage-to-current converter 52.

Since $V_{ref1}$ is set equal to $(\frac{1}{2})V_{BB}$ as described above with reference to FIG. 3, the voltage at point S5 with respect to the reference voltage $V_{ref1}$ is $v_0/4$ and the following Equation is obtained:

$$I_5 = (1/R521)(-V_{BB}/4 - v_0/4) \qquad (2.4)$$

Therefore, if R521=2R22=2R32, the voltage difference between points $S_2$ and $S_3$ is given by Equation (2.4) which corresponds to Equation (1.2) in which $k_0 = 4$.

It is obvious that non-linear, amplitude-dependent inductance elements could equally be as well employed instead of the Zener diodes.

As described in the foregoing, the first feedback loop synthesizes high impedances by changing the impedance characteristics of the resistors $R_B$ to high values.

The second feedback loop has a transfer function $-2R_F/Z_X$ which acts in a way to reduce the impedance realized by the first feedback loop between the line terminals T and R of the two-wire subcriber line to a desired value. This impedance reduction occurs exclusively at frequencies higher than a frequency value determined by the high-pass frequency characteristic of the DC decoupling capacitors of the second feedback loop.

The third feedback loop acts in a way to reduce the high impedances realized by the first feedback loop to lower impedance values desired between the terminal T and ground and between the terminal R and voltage source at $V_{BB}$ in a frequency range determined by the inherent low-pass frequency characteristic of the third feedback loop.

The following is a description of the advantages of the impedance synthesizing aspect of the present invention. Although the second and third feedback loops differ in operating frequency range, both of these loops can be treated as a loop having an equal function having regard to their impedance reducing characteristics. Therefore, the first and second feedback loops are taken up in the following description.

Consider a transfer function G which is a combined value of the transfer functions of the first and second feedback loops and is given by Equation (3.1)

$$G = 1 - 2R_F/Z_X \qquad (3.1)$$

where, $R_F = mR_B$, $Z_X = mZ_T$. The input impedance Z looking into the subscriber line from the line terminals T, R is:

$$Z = 2RB/(1-G) = 2R_B/[1-\{(1-2mR_B/mZ_T)\}] = Z(3.2)$$

By appropriately determining the ratio of $R_F$ of the impedance network 424 to $Z_X$ of the feedback resistor 427 (FIG. 4), a desired impedance value can be realized between the terminals T and R.

Rearranging Equation (3.2) results in Equation (3.3) as follows:

$$Z = 2R_B/\{1-(G_1-G_2)\} \qquad (3.3)$$

where, $G_1 = 1$ and $G_2 = 2R_B/Z_X$.

Table given below shows deviations of the impedance value Z in response to a 1% deviation of the transfer functions $G_1$ and $G_2$ under the conditions that $G (= G_1 - G_2)$ is in the range between 0.5 and 0.95.

TABLE

| G | $\Delta G_1$ (%) | $\Delta G_1$-Dependent $\Delta Z$ (%) | $\Delta G_2$ (%) | $\Delta G_2$-Dependent $\Delta Z$ (%) |
|---|---|---|---|---|
| 0.5 | 1 | 2.0 | 1 | −1 |

TABLE-continued

| G | $\Delta G_1$ (%) | $\Delta G_1$-Dependent $\Delta Z$ (%) | $\Delta G_2$ (%) | $\Delta G_2$-Dependent $\Delta Z$ (%) |
|---|---|---|---|---|
| 0.7 | 1 | 3.4 | 1 | −1 |
| 0.8 | 1 | 5.3 | 1 | −1 |
| 0.9 | 1 | 11 | 1 | −1 |
| 0.95 | 1 | 25 | 1 | −1 |

It is seen that the absolute value of the $\Delta G_2$-dependent deviation of impedance Z equals the absolute value of the deviation of transfer function $G_2$. The present invention thus requires high precision circuit elements to be provided only in the first feedback loop. Only the operational amplifier 1 and those used in the tip driver 2 and ring driver 3 are the ones that are required to meet the wide bandwidth requirement. Use of high precision type resistors is also limited to those employed in the first feedback loop. The other operational amplifiers and their feedback resistors, the input impedance and resistor, and the summing resistors are only required to meet the precision and bandwidth requirements imposed between the terminals T and R. Hence, the second and third feedback loops need not be constructed of high precision components. This is advantageous both in circuit design and manufacture. While mention has been made of an impedance synthesizer of which the impedance is balanced with respect ground, it is obvious to provide an impedance synthesizer having an unbalanced impedance with respect to ground.

The following is a description of the advantages of the two wire to four wire conversion aspect of the present invention.

Consider the transfer function $H_{42}$ of a path from the four-wire input terminal Rx to the two-wire subscriber line. The feedback voltage $V_F$ developed between the outputs of the tip and ring drivers 2, 3 is given by Equation (4.1)

$$V_F = (1 - 2R_F/Z_X)V_{2w} + (2R_F/Z_X + 2R_F/Z_Y)V_{Rx} \quad (4.1)$$

where $V_{2w}$ is the line voltage to be transmitted to the two-wire subscriber line and $V_{Rx}$ represent the voltage developed at the terminal Rx.

Since $V_{2w}$ is given by $$V_{2w} = \{Z_L/(Z_L + 2Z_F)\}V_F \quad (4.2)$$

$$= (Z_L/(Z_L + 2Z_F)) \times$$

$$\{(1 - 2R_F/Z_X)V_{2w} + (2R_F/Z_X + 2R_F/Z_Y)V_{Rx}\}$$

where, $Z_L$ is the load impedance of the two-wire subscriber line.

The transfer function $H_{42}$ is given by Equation (4.3) which is obtained by rearraning Equation (4.2) and substituting $mZ_T$ and $mZ_B$ for $Z_X$ and $Z_Y$, respectively and $mR_B$ and $R_B$ for $R_F$ and $Z_F$, respectively.

$$H_{42} = V_{2w}/V_{Rx} = \{Z_L/(Z_L+Z_T)\}\{(Z_T+Z_B)/Z_L\} \quad (4.3)$$

With $Z_B = Z_L$, the transfer function $H_{42} = 1$ is obtained. This indicates that the transfer function $H_{42}$ has a flat frequency response.

Consider now the transfer function $H_{44}$ of a crosstalk path from the four-wire input terminal Rx to the four-wire output terminal Tx. Since $H_{42} = 1$ for $Z_B = Z_L$, and the signal from terminal Rx is subtracted from the signal transmitted from the two-wire subscriber line, the transfer function $H_{44} = 0$ is obtained. Likewise, the transfer function of a path from the subscriber line to the four-wire output terminal Tx is unity. It is seen therefore that the present invention provides the hybrid function of conversion between the signal of a subscriber line and the signal of a four-wire circuit and that this hybrid function is achieved by the use of only two impedance networks 424 and 425. Another advantage resides in the fact that, since the impedance values of the networks 424 and 425 can have desired values, the invention requires no reactance components for feeding currents to the two-wire subscriber line. Simple resistance elements such as current feeding resistors $R_B$ are sufficient for this purpose. From the practical standpoint, it is not necessary to treat such resistance elements as impedance networks.

The following description relates to the advantage of the variable inductance feature of the present invention provided by the low-pass filter 51, FIG. 5. The transfer function $H_{LFS}$ of the low-pass filter 51 for small amplitude signals is given by Equation (5.1), $$H_{LFS} = 1/(j\omega C_{511} R_{511} + 1) \quad (5.1)$$

where, $C_{511}$ and $R_{511}$ are the capacitance and resistance values of the capacitor C511 and resistor R511, respectively. The transfer function $H_{LFL}$ for large amplitude input signals is given by Equation (5.2), $$H_{LFL} = 1/(j\omega C_{511} R_{512} + 1) \quad (5.2)$$

where, $R_{512}$ is the resistance value of resistor R512. The input impedance Zin looking into the subscriber line from the tip-ring terminals T, R is $$Z_{in} = 4R_B/H_{LF} \quad (5.3)$$

if $R_{521} = 2R_{22}$, where $R_{521}$ is the resistance value of resistor R521 of the voltage-to-current converter 52 and $R_{22}$ is the resistance value of the feedback resistor R22 of tip driver 2 (FIG. 3). Therefore, the equivalent inductance $L_S$ of the low-pass filter 51 for small amplitude signals is given by $$L_S = 4R_B \cdot C_{511} \cdot R_{511}$$

and the equivalent inductance $L_L$ of the filter 51 for large amplitude signals is given by $$L_L = 4R_B \cdot C_{511} \cdot R_{512}.$$

If $R_B = 100$ ohms, $R_{511} = 100$ killoohms, $R_{512} = 100$ ohms and $C_{511} = 1$ microfarad, ignoring the impedance of the Zener diodes, the equivalent inductances $L_S$ and $L_L$ are 40 henry and 40 millihenry, respectively.

Therefore, the subscriber line interface circuit of the present invention presents a high impedance to small amplitude signals such as speech signals and a low impedance to large amplitude signals such as dial pulses. Typically, the response time of the line interface circuit is 100 milliseconds to speech signals and 0.1 milliseconds to dial pulses. Dial pulses can thus be sharply discriminated.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A subscriber line interface circuit comprising:

differential amplifier means having input and output terminals, said input terminals of said amplifier means being coupled through line terminals to a two-wire subscriber line for detecting a voltage difference developed across said line terminals;

first and second resistance means of equal resistance values, each of said resistance means having first and second ends, said first and second resistance means being respectively coupled at their ends to said line terminals;

driver means having input and output terminals, said output terminals of said driver means being coupled to said second ends of said first and second resistance means for driving a load coupled to the distant end of said two-wire line;

first feedback means coupled from the output terminals of said differential amplifier means to the input terminals of said driver means for changing the impedance characteristics of said first and second resistance means so that a high impedance is synthesized across each of said first and second resistance means; and second and third feedback means coupled from an output of said differential amplifier means to an input of said driver means, each of said second and third feedback means having a different passband frequency characteristic, for reducing the synthesized impedances to a predetermined value, said second and third feedback means having high and low frequency responses, respectively, wherein said first feedback means is such that the transfer function from the input terminals of said differential amplifier means through said first feedback means to the output terminals of said driver means is unity, said second feedback means being such that the transfer function from the input terminals of said differential amplifier means through said second feedback means to the output terminals of said driver means is $-2R_B/Z_T$ in the region of said high-pass frequency response, and said third feedback means being such that the transfer function from the input terminals of said differential amplifier means through said third feedback means to the output terminals of said driver means is $-R_B/R_{FD}$ in the region of said low-pass frequency response, where $R_B$ is the resistance values of said first and second resistance means, $Z_T$ is a terminal impedance looking into said line terminals from said two-wire line, and $R_{FD}$ is a battery feed resistance.

2. A subscriber line interface circuit as claimed in claim 1, wherein said third feedback means has a time constant value variable as a function of the amplitude of an input signal applied thereto.

3. A subscriber line interface circuit as claimed in claim 1, wherein said differential amplifier means is arranged to generate a pair of balanced output signals, said second feedback means comprising:

a balance-to-unbalance converter for converting said balanced output signals to an unbalanced signal;

a hybrid circuit responsive to said unbalanced signal through DC decoupling capacitance means and further responsive to an input signal from a four-wire circuit for generating an output signal for application to said four-wire circuit and a feedback voltage signal; and voltage-to-current converter means for converting said voltage signal to a current signal and applying the current signal to said driver means.

4. A subscriber line interface circuit as claimed in claim 3, wherein said hybrid circuit comprises phase delay means for introducing a delay to the input signal of said four-wire circuit.

5. A subscriber line interface circuit as claimed in claim 4, wherein said hybrid circuit comprises:

a summing circuit for combining said unbalanced signal with the signal delayed by said phase delay means and applying the combined signals to said four-wire circuit;

a unity gain inverting amplifier responsive to said input signal from said four-wire circuit;

a first two-port impedance network having a first port coupled to the output of said summing circuit and having a multiple of said terminal impedance;

a second two-port impedance network having a first port coupled to the output of said unity gain inverting amplifier and having a multiple of said terminal impedance; and an operational amplifier coupled to second ports of said first and second impedance networks and having a feedback resistor coupled from the output to the input terminals thereof for generating said feedback voltage signal, said feedback resistor having a multiple of the resistance value of each of said first and second resistance means.

6. A subscriber line interface circuit as claimed in claim 1, wherein said third feedback means comprises:

a low-pass filter having a time constant variable as a function of the amplitude of an input signal applied thereto from said differential amplifier means;

a voltage-to-current converter for converting a voltage output signal from said low-pass filter to a current output signal in accordance with a reference voltage; and a pair of current mirror circuits coupled to the output of said voltage-to-current converter for supplying a current to said driver means.

7. A subscriber line interface circuit as claimed in claim 6, wherein said low-pass filter includes an amplitude-dependent, nonlinear reactive component.

8. A subscriber line interface circuit as claimed in claim 7, wherein said low-pass filter comprises a series circuit including a pair of breakdown diodes coupled in series in opposite directions to each other and a first, low-valued resistance coupled in series with said diodes, a second, high-valued resistance coupled in parallel with said series circuit to form a parallel resistance network, and a capacitance coupled in series with said resistance network.

9. A subscriber line interface circuit comprising:

differential amplifier means having input and output terminals, said input terminals of said amplifier means being coupled through line terminals to a two-wire subscriber line for detecting a voltage difference developed across said line terminals;

first and second resistance means of equal resistance values, each of said resistance means having first and second ends, said first and second resistance means being respectively coupled at their first ends to said line terminals;

driver means having input and output terminals, said output terminals of said driver means being coupled to said second ends of said first and second resistance means for driving a load coupled to the distant end of said two-wire line;

first feedback means coupled from the output terminals of said differential amplifier means to the input terminals of said driver means for changing the impedance characteristics of said first and second resistance means so that a high impedance is synthesized across each of said first and second resistance means; and second feedback means having a high-pass frequency response and third feedback means having a low-pass frequency response, said second and third feedback means being coupled from an output of said differential amplifier means to an input of said driver means, each of said second and third feedback means having a different passband frequency characteristic, for reducing the synthesized impedances to a predetermined value, wherein said third feedback means comprises:

a low-pass filter having a time constant variable as a function of the amplitude of an input signal applied thereto from said differential amplifier means;

a voltage-to-current converter for converting a voltage output signal from said low-pass filter to a current output signal in accordance with a reference voltage; and a pair of current mirror circuits coupled to the output of said voltage-to-current converter for supplying a current to said driver means.

10. A subscriber line interface circuit as claimed in claim 9, wherein said low-pass filter includes an amplitude-dependent, nonlinear reactive component.

11. A subscriber line interface circuit as claimed in claim 10, wherein said low-pass filter comprises a series circuit including a pair of breakdown diodes coupled in series and poled in opposite directions with respect to each other and a first, low-valued resistance coupled in series with said diodes, a second, high-valued resistance coupled in parallel with said series circuit to form a parallel resistance network, and a capacitance coupled in series with said resistance network.

* * * * *